3,301,614
BEARING ADAPTER
Walter D. Haentjens, R.D. 1, Sugarloaf, Pa. 18249
Filed July 7, 1964, Ser. No. 380,836
1 Claim. (Cl. 308—187)

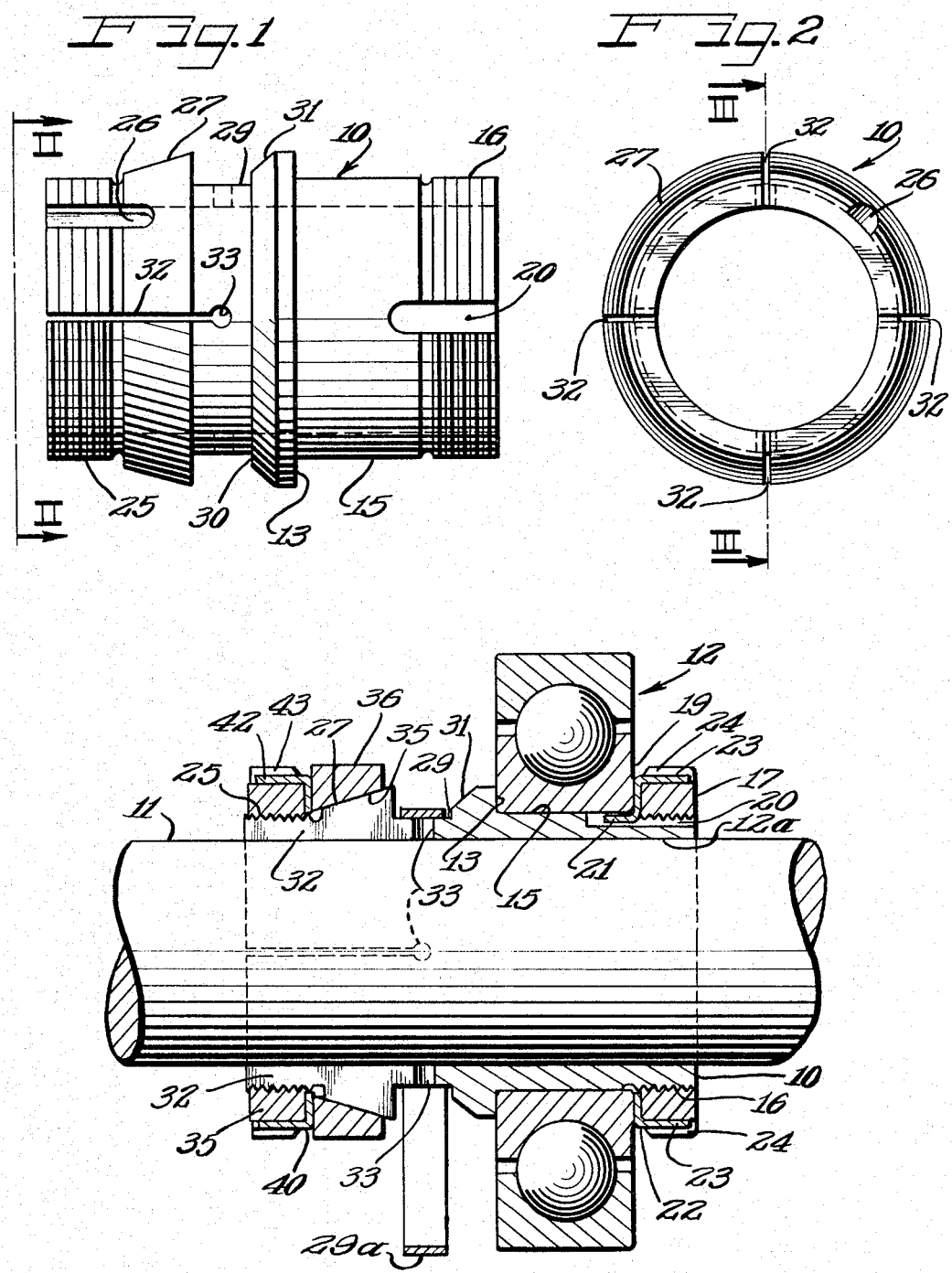

This invention relates to bearing adapters for mounting and positioning bearings in a required position along a shaft.

Bearings and particularly anti-friction bearings, such as ball bearings are frequently mounted on shafts by clamping the inner race of the bearing against a shoulder or abutment machined on the shaft, to accurately locate the bearing.

In many cases, however, it is not practical or economical to form a shoulder integrally with the shaft, nor is it practical to thread the shaft to receive the bearing lock nut, locking the bearing in position against the abutment.

While adapters have heretofore been in use for mounting antifriction bearings on shafts, such adapters are of necessity so constructed that inaccuracies in fit are transferred to the bearing. The use of such adapters therefore, has only been practical where accuracy in locating and radial placement of the bearing is not a prerequisite and cannot be used on equipment which must necessarily be held to close tolerances and rotate about a true center.

A principal object of the invention, therefore, is to provide a novel and improved form of bearing adapter arranged with a view towards extreme accuracy in radial placement of a bearing on a shaft.

Another object of the present invention is to provide an adapter and locater for bearings on shafts, in which the adapter may accurately, radially locate a bearing on a plane shaft in any required position along the shaft.

Another object of the invention is to provide a novel and improved form of bearing adapter arranged with a view toward simplicity in construction and positive and accurate radial placement of a conventional ball bearing on a shaft.

A further object of the invention is to provide a bearing adapter for mounting bearings on shafts in the form of a sleeve having a positioning stop thereon taking the place of the usual shoulder shaft, determining the placement of the bearing thereon and secured to the shaft remote from the stop and bearing on the clamping principle.

A still further object of the invention is to provide a mounting member for mounting bearings on shafts in which the mounting member has concentric inner and outer peripheries and a positioner for the bearing formed thereon taking the place of the usual shoulder on the shaft, and in which the mounting member is clamped on the shaft by contracting an end portion of the mounting member remote from the positioner.

These and other objects of the invention will appear from time to time as the following specification proceeds and with reference to the accompanying drawing wherein:

FIGURE 1 is a plan view of an adapter constructed in accordance with the principles of the present invention;

FIGURE 2 is a sectional view taken substantially along line II—II of FIGURE 1; and FIGURE 3 is a longitudinal sectional view taken through the adapter, showing the adapter mounted on a shaft and locating an anti-friction bearing in a fixed location along the shaft.

In the embodiment of the invention illustrated in the figures in the drawing, I have shown in FIGURE 3, an adapter sleeve mounted on a shaft 11 and forming a mounting member and positioner for an anti-friction bearing 12, in the form of a ball bearing, the inner race of which is held in position by the adapter and the outer race of which may be mounted in a bearing housing (not shown) for the shaft.

The adapter 10 may be of a generally sleeve-like form, having a cylindrical inner peripheral portion 12a and having a bearing locating shoulder or abutment 13 disposed intermediate the ends of said adapter. A plane cylindrical outer peripheral portion 15 of the sleeve concentric with the inner periphery 12a extends axially outwardly from said locating shoulder towards one end of said sleeve and forms a mounting for an inner race 19 of the anti-friction bearing 12. The outer end portion of the cylindrical peripheral portion 15 of the sleeve is threaded, as indicated by reference character 16, to receive a lock nut 17 for locking the inner race 19 of the anti-friction ball bearing 12 against the positioning shoulder 13. As shown in FIGURE 1, a slot 20 extends along the threaded portion 16 of the sleeve for a portion of the thickness of said sleeve and beyond said threaded portion into the cylindrical surface 15 for a short portion of the length thereof and is adapted to be engaged by a tang 21 of a lock washer 22. The lock washer 22 is interposed between the ends of the lock nut and the ball bearing and has a plurality of radially extending locking tangs 23 bent horizontally to extend along and within slots 24 opening to the periphery of said lock nut. The lock washer and lock nut may be of conventional forms, so need not herein be shown or described further.

The opposite end of the sleeve 10, from the threaded portion 16, is threaded as indicated by reference character 25 and the threaded portion thereof is intersected by an axially extending slot 26 extending along said sleeve into a tapered clamping surface 27 extending along said sleeve from the threaded portion 25 and flaring outwardly therefrom. A recess having an inner cylindrical surface 29 is formed between the inner extremities of the tapered clamping surface 27 and a shoulder 30 extending radially outwardly of the cylindrical surface of said groove, and terminating into a beveled surface 31, of an annular rib forming the body portion of the shoulder 13. An oil ring 29a encircles the cylindrical surface 25 for lubricating the bearing 12.

The threaded end portion 25 and the tapered clamping surface 27 have four radial circumferentially spaced slots or slits 32 extending therealong beyond the tapered clamping surface 27 and along the grooved portion 29 and terminating in drilled holes 33 extending radially through the cylindrical surface 29 of the grooved portion of the sleeve.

The tapered clamping surface 27 is adapted to be engaged by an internal tapered surface 35 of a wedge ring 36. The taper of the internal tapered surface 35 is the same as the taper of the tapered clamping surface 27. The wedge ring 36 is moved along the tapered clamping surface 27 by turning movement of a lock nut 39 threaded on the threaded end portion 25 of the adapter sleeve.

A lock washer 40 like the lock washer 22 has a tang (not shown) fitting into the groove 26 and has circumferentially spaced radially extending ears 42 fitting in grooves 43 of the lock nut. The lock washer 40 is thus interposed between the lock nut 39 and outer end surface of the wedge ring 36 and forces the wedge ring to move along the clamping surface 27 and contract the slotted portion of the adapter sleeve and clamp said sleeve to the shaft 11. The ears 42 are bent over into the slots 43 to permanently lock the wedge ring 36 in position along the tapered clamping surface 27 and retain the adapter in position on the shaft 11.

It may here be seen that the respective concentric inner and outer peripheral portions 12a and 15 are located remote from the split end portion of the adapter sleeve and that the clamping of the split end portion of the sleeve will not affect the concentricity of the portion 12a and 15. The adapter may thus provide accurate radial placement of a bearing on a shaft in a predetermined location along the shaft.

It may further be seen that clamping of the sleeve to the shaft may be attained while the adapter sleeve is held in a precise location on the shaft, and clamping in no way is dependent upon resilient clamping members or upon axial movement of the adapter sleeve along the shaft and contraction of the adapter is in no way transferred to the bearing.

While I have herein shown and described one form in which the invention may be embodied, it may readily be understood that various variations and modifications in the invention may be attained without departing from the spirit and scope of the novel concepts thereof.

I claim as my invention:

In a bearing mounting, and in combination with an antifriction bearing having inner and outer aligned races, a sleeve, for mounting on a shaft, having a cylindrical inner periphery extending for the length thereof and a concentric outer peripheral portion extending for a portion of the length thereof, said sleeve having first and second threaded end portions, an abutment shoulder determining the inner limits of said concentric outer peripheral portion and extending radially outwardly therefrom, said shoulder being abutted by and locating said inner race of said bearing on said concentric outer cylindrical peripheral portion, a nut threaded on said first threaded end portion of said sleeve and retaining said race in position against said shoulder, a tapered clamping surface extending radially outwardly of said sleeve and having a small diameter end portion adjacent said second threaded end portion of said sleeve and a large diameter end portion spaced along said sleeve and spaced from said shoulder, a plurality of slits extending axially along said second threaded end portion and along said tapered clamping surface, into the space between said large diameter end portion of said tapered clamping surface and said abutment shoulder, radially drilled portions determining the inner limits of said slits and extending through said sleeve, a wedge ring having a tapered internal periphery engageable with said tapered clamping surface, a nut moving said wedge ring along said tapered clamping surface to contract said sleeve and clamp said sleeve in a selected position on a shaft without transferring distortion of said tapered clamping surface of said sleeve to said concentric outer peripheral portion, the space between the large diameter end of said tapered clamping surface and said abutment shoulder forming an oil ring groove, and an oil ring of larger diameter than said sleeve mounted in said groove for lubricating said bearing.

References Cited by the Examiner

UNITED STATES PATENTS

| | | | |
|---|---|---|---|
| 2,001,675 | 5/1935 | Eisgruber | 308—236 |
| 2,335,557 | 11/1943 | Winter | 308—28 |
| 2,564,335 | 8/1951 | Lake | 287—52.06 |

MARTIN P. SCHWADRON, *Primary Examiner.*

FRANK SUSKO, *Examiner.*